United States Patent
Rodi

(10) Patent No.: US 7,091,473 B2
(45) Date of Patent: Aug. 15, 2006

(54) MEASURING SYSTEM FOR RECORDING ANGULAR AND LINEAR ABSOLUTE VALUES

(76) Inventor: Anton Rodi, Paul-Ehrlich-Strass 1, D-69181 Leimen (DE)

( * ) Notice: Subject to any disclaimer, the term of this patent is extended or adjusted under 35 U.S.C. 154(b) by 68 days.

(21) Appl. No.: 10/804,148

(22) Filed: Mar. 17, 2004

(65) Prior Publication Data

US 2004/0183002 A1    Sep. 23, 2004

(30) Foreign Application Priority Data

Mar. 18, 2003 (DE) ................................ 103 12 045

(51) Int. Cl.
*G01D 5/34* (2006.01)
(52) U.S. Cl. .............................. 250/231.13; 250/231.15
(58) Field of Classification Search ....................... 250/231.13–231.18; 341/7, 11, 13, 31; 33/1 PT, 33/1 N; 320/107, 108, 166; 356/616–619; 307/66

See application file for complete search history.

(56) References Cited

U.S. PATENT DOCUMENTS

| | | | | |
|---|---|---|---|---|
| 4,079,251 A | * | 3/1978 | Osann, Jr. .............. | 250/231.16 |
| 4,672,279 A | * | 6/1987 | Hosokawa et al. ...... | 318/568.2 |
| 4,922,176 A | * | 5/1990 | Kim ........................... | 318/602 |
| 5,038,272 A | * | 8/1991 | Calcagno et al. ............ | 700/64 |
| 5,092,051 A | * | 3/1992 | Holmer et al. ................ | 33/1 N |
| 5,323,309 A | * | 6/1994 | Taylor et al. .................. | 700/79 |
| 5,874,821 A | * | 2/1999 | Monleone .................... | 318/600 |
| 6,172,359 B1 | * | 1/2001 | Stridsberg .............. | 250/231.13 |
| 6,683,543 B1 | * | 1/2004 | Yeo ............................. | 341/13 |
| 6,812,861 B1 | * | 11/2004 | Wolf ........................... | 341/11 |

FOREIGN PATENT DOCUMENTS

DE    195 05 176 A1    8/1995

* cited by examiner

*Primary Examiner*—Stephone B. Allen
*Assistant Examiner*—Davienne Monbleau
(74) *Attorney, Agent, or Firm*—Laurence A. Greenberg; Werner H. Stemer; Ralph E. Locher

(57) ABSTRACT

An absolute measuring system for the determination of angles or paths is described. During normal operation the encoder of this system is fed by a voltage supply (mains). If the voltage supply fails the encoder is switched to an auxiliary power supply which uses less energy. In this operating mode the encoder only calculates a coarse value of the measured value which it stores in the memory. To maintain the auxiliary power supply a chargeable memory is provided which is assigned to the encoder.

16 Claims, 2 Drawing Sheets

MEASURING SYSTEM FOR RECORDING ANGULAR AND LINEAR ABSOLUTE VALUES

BACKGROUND OF THE INVENTION

Field of the Invention

The angle and linear measuring systems currently used in industry are predominantly those which record the relative displacement of the measuring unit incrementally as well as add to a previously determined or inputted reference value depending on direction and thus calculate the relevant absolute value. The disadvantage of this is that the absolute position is lost when the mains is switched off or fails and requires a new reference to be determined or inputted. These measuring systems are also very sensitive to disturbance variables and transient malfunctions and are hence unsafe.

This problem has been somewhat alleviated in the case of linear measuring systems by applying a more or less expensive and defined reference track to the scale which simplified the travel of the reference and allowed limited control of the measured values.

For angle measuring systems or rotary encoders the reference impulse for the travel of the reference has been taken for each revolution and used to determine the initial absolute value which can also be checked and corrected. Other measures must be taken in the case of multiturn encoders, however, if the revolutions themselves i.e. multiples of $360°=2$ need to be recorded. Either a separate drive is integrated into the measuring system to record its position using position sensors for recording all of the revolutions made separately, or a battery is used that allows a separate integrated rotational measuring system with energy saving sensors and counting logic to be supplied with power and permanently stores information during mains failure. The drives are bulky, limit durability as well as the rotational positions that can be recorded and are also costly due to the additional sensor technology. The separate rotational measuring system, equipped mainly with permanent magnets and counting logic by means of magnetically conductible segment disks as well as Reed contacts, is also bulky and has limited durability due to its mechanical contacts as well as critical battery life in places prone to excessive temperature where long life industrial encoders are integrated e.g. electric motors. For angle measuring Systems there have also been repeated attempts to avoid using a drive or battery by designing devices using permanent magnets and coils in such a way that the switching energy resulting from the changing magnetic field was used to count the rotational position and store the counter reading. But these measuring devices are also bulky and have limited durability due to their use of special electronic Flash-memory components which also means that they are not very widespread.

Reacting to the increasing desire for absolute measuring systems, which at least save on the travel of a reference and provide safe recording of measured values that are as free from interference as possible and make them available for data transfer, new absolute measuring systems have been developed and brought onto the market in recent years. For Instance, patent specification DE 19505176A1 describes an optical process that uses an m-sequence-code arranged in a line. However, a PCR code located on a separate track has also been used for magnetic linear measuring systems. Apart from the problem that the code length must be determined for each scale length, magnetic scales are bulky (approx. 20 mm wide×2 mm high) and expensive to manufacture. The dimensions of the encoders are also dependant on the code length and magnetic pole pitch, e.g. 11 Bit×5 mm≧55 mm long and vary in their sensor arrangements which also depends on the code length and have different evaluation electronics for the different code sequences.

An additional difficulty for angle measuring systems is that the code selection with a beginning and end must be continuously selected in cycles and the code length as well as code pitch must be adjusted to the diameter of the scale. This permits just one system with a fixed diameter and means a new design of encoder is always required if the diameter is changed. In addition there is still no satisfactory solution to the problem of recording multiple revolutions which is becoming increasingly important, for example, in the field of robotics.

SUMMARY OF THE INVENTION

The object forming the basis of the invention is to provide solutions to the above-mentioned shortcomings and a lasting solution for angle and linear absolute measuring systems of the future.

It is preferable in this respect to refer to a novel method of creating absolute values for angles and paths according to patent right application 103 120 45.9, in which only the sensor arrangement needs to be supplied with power to record segments when mains power fails. This is done according to the present invention by using a chargeable, stored auxiliary power supply belonging to the measuring device: the object of the main application can be more clearly stated as being a measuring system to record absolute values of angles and paths in which these are recorded by a sensor arrangement and the scale is composed of at least two segments designed to record absolute values in the same way. In this system the scale has at least one track to determine the absolute value of the particular segment reached by means of the sensor arrangement and circuits which provide the total absolute value from the absolute value of the segment and the calculated absolute value within the segment for further processing. The system is powered by the mains. There is also a switch arrangement provided which switches to an auxiliary power supply when the mains power fails. In this operating mode the sensor arrangement is only used to determine the absolute value of the particular segment reached. In principle the invention may be used for all absolute measuring systems that record at least the absolute encoded segments with a sensor and its accompanying switch arrangement in a way which saves energy when the mains power fails.

The absolute measuring systems designed according to the above mentioned patent right application may be very small and suitable for Integrating Into actuators (electric motors; mechanical, electrical, pneumatic and hydraulic controlling elements) as well as apparatus and machines. The increasing miniaturization of semiconductors will enable the complete absolute measuring system including the sensor to be fitted into the size of a single chip in the foreseeable future. The location of the chargeable and stored auxiliary power supply will be increasingly away from the immediate vicinity of the integrated measuring device, which is an advantage if for no other reason than because of the lack of space for integration at the place of measurement and the adverse environmental conditions such as extremes of temperature which are often found there.

In any event the chargeable auxiliary power supply belonging to the measuring device should always be located before the first interface e.g. connector in the mains cabling to the superior control device. This will ensure that when the external mains connection to the control device is broken there is no loss of stored measured data. It is beneficial to locate the chargeable auxiliary power supply in the housing of the first pluggable interface.

Of course it is beneficial to locate the chargeable auxiliary power supply in the housing of the measuring system itself if space and environmental conditions allow. It is also appropriate for a number of reasons to integrate the chargeable auxiliary power supply in a special housing immediately next to the limited space where the absolute measuring system is integrated and connect it to the measuring system with the shortest possible connectors. Most importantly, if there is no wired external mains power supply, a separate housing for the chargeable auxiliary power supply may contain additional arrangements that can use wireless external power to assist in charging the auxiliary power supply. This may use for instance the energy from electromagnetic radiation for close and long range or also by means of transformer coupling of alternating currents or by a displacement current of mutually inducing electric and magnetic fields. Light rays such as sunlight are also a form of electromagnetic waves for energy transfer as are for example light rays which may be with a frequency visible or invisible to humans. All physical principles of conversion which can be considered as practicable methods of electrically charging the auxiliary power supply may be used to charge the auxiliary power supply. This should include in particular conversion of kinetic energy into electrical charge that can be obtained from the relative motion of an encoder and a scale with alternating magnetic poles by an induction effect with at least one coil system. A large number of physical methods for wireless charging of the auxiliary power supply are possible according to how they can be integrated as well as the environmental conditions and can enable counting of segments due to the low energy consumption of the selected sensor arrangement. An example is the possible use of well-known solar cell or even radio energy converters to maintain sufficient charge in the design of the measuring system according to the invention.

Maintaining sufficient charge in the auxiliary power supply of the measuring system is very helpful for keeping the selected charge capacity as small as possible. This basic storing of charge of the auxiliary power supply is crucial to the size/volume of the energy carrier, but also for how long the reserve supply will last when it is not possible to maintain sufficient charging. The most important thing here is that the transferable energy $E=u*i*t=P*t$ is sufficient to allow as much energy as is required for use in the measuring system. A useful life of approx. 10 years gives an indication for choosing what size to make the auxiliary power supply which employs for example a rechargeable battery. Supposing the recharging energy makes up x % of the total energy requirement, the charge capacity of the auxiliary power carrier is therefore:

$$Q=(1-x)*i*t;$$

where i represents the current of the measuring device and t its period of use.

For x=50% and i=10 A t=365 days/year*24h/day*10 years

=87.6*10³h $$Q=(1-x)*i*t=0.5*10-5A*87.6*10^3h$$

$$Q=43.8*10-2*A*h=438 \text{ mAh}$$

The charge capacity allows the use of for example coin cell batteries, which are small and can be fitted inside the housing of, say, a connector. The essential thing here is to design the sensor arrangement with the lowest possible current requirement and to base the energy for recharging the auxiliary power supply/battery as far as possible on the required power output. By doing this, the dimensions and charge capacity will be kept small and have the right size for emergency use.

The chargeable auxiliary power supply may be designed in a number of ways, those of practicable use being strongly influenced by cost and conditions of use and safety. The following are examples of designs that can be used:

rechargeable battery
chargeable condenser
chargeable condenser with rechargeable battery
chargeable condenser with non chargeable battery The rechargeable battery will be the most common and preferred version for standard angle and linear measuring systems especially where there is a wired mains power supply. This arrangement is of particular benefit when there is a need for an additional external auxiliary power supply. This redundant arrangement provides for "single fault safety" and allows the mutual exchange/repair of the auxiliary power supply of the measuring system and the external auxiliary power supply during power cuts.

The chargeable condenser as sole auxiliary power supply can be considered cost-effective when possible interruptions to the mains supply are only less than approx. 1 hour but also on those occasions when the loss of the absolute position just for short interruptions is not acceptable and referencing of the measuring device can be carried out straight away during longer power failures.

The rechargeable battery with chargeable condenser is beneficial when there is no external auxiliary power supply present. The arrangement is redundant during a fault and allows the battery to be exchanged if necessary, without loss of measured data. In addition the battery can be made smaller depending on the condenser.

The chargeable condenser in combination with a non chargeable battery is an alternative worth mentioning, in order to save cost. This version is particularly useful if a longer interruption of the mains supply would only be expected in exceptional circumstances.

If there is an additional external auxiliary power supply located in the control system away from the absolute measuring system, the chargeable auxiliary power supply belonging to the measuring system can be made particularly small. The chargeable auxiliary power supply belonging to the measuring system should be constructed for use only in cases where there is a normal short-term disconnection of the external auxiliary power supply from the measuring system, e.g. when removing a connector or repairs/exchanges during servicing.

In the case of the redundant combination of the external auxiliary power supply with the chargeable auxiliary power supply belonging to the measuring system it is appropriate to use a rechargeable small battery or the chargeable condenser if only short-term disconnection from the external auxiliary power supply is to be expected. However, attention must always be paid to the low current drain of the measuring system during interruptions in mains power in the design of such systems as well, since the external auxiliary power supply has a limited charge capacity and is used for a large number of sensors as well as other controls for data backup, e.g. for multiaxle robots.

The rechargeable auxiliary power supply belonging to the absolute measuring system offers the additional advantage of radio transmission of measured data suitable for use in industry. This not only reduces the expense of costly cables and connectors for transmitting measured data but also saves the considerable cost involved in bus systems for distributed control systems. It also solves or considerably reduces the problem of expensive cabling and damage caused to it by changes in conditions for moving absolute encoders. Even if a wireless auxiliary power supply is insufficient, for example where there is an intensive exchange of measured data, the only additional cabling required is for the mains power supply. This consists of just two power cables since even an external auxiliary power supply which might be present can feed the absolute encoder via these cables. These two cables can be fitted in the controls to the absolute encoders as bus connections without any special shielding. Not only are the thin cables flexible and space saving for fitting into instruments and machines, their sensitivity to changing conditions is considerably reduced and have the advantage that costs for cabling and connectors are reduced.

In the following, embodiments and further development of the invention will be described in more detail with reference to the drawings.

DESCRIPTION OF THE PREFERRED EMBODIMENTS

Figure 1:
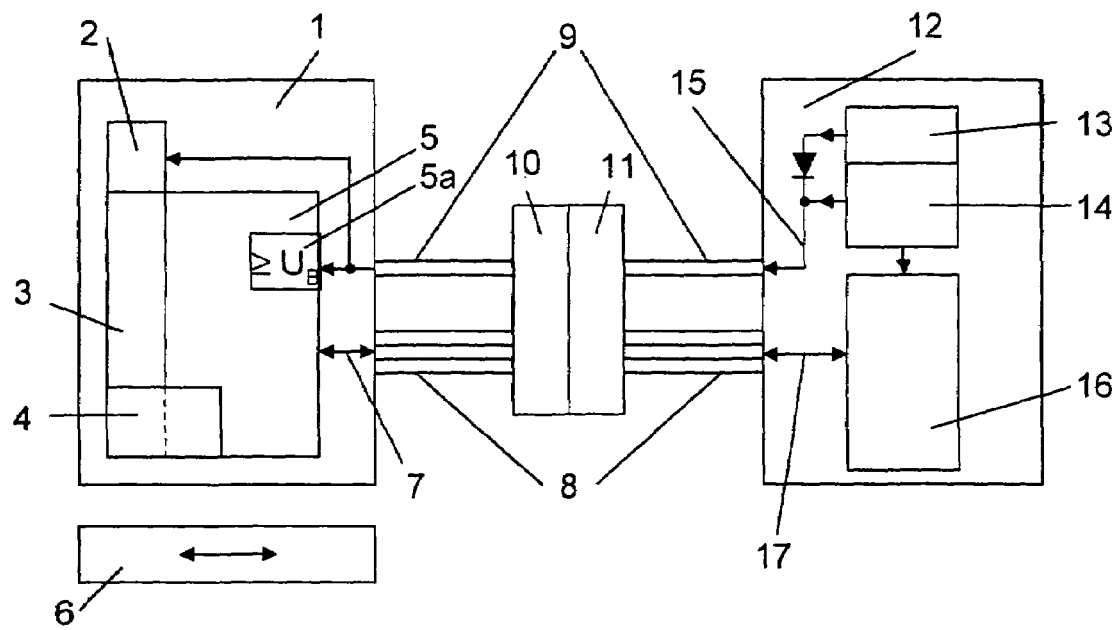
FIG. 1 an embodiment with the chargeable auxiliary power supply in the encoder FIG. 2 an embodiment with an external auxiliary power supply FIG. 3 an embodiment with signal transfer by radio FIG. 4 an embodiment without connecting cables between the encoder and system control

In FIG. 1 an absolute encoder is labelled 1. It has a rechargeable auxiliary power supply e.g. a rechargeable battery 2. Logic 3 is used to record the segments. The sensor arrangements for both absolute values are labelled 4. Block 5 contains the logic for measured signal processing and transfer. The moving scale via whose tracks both measured values are determined is labelled 6. The measured results transferred from the encoder 1 are fed via the serial data exchange 17 on the control side of control electronics 16 to the evaluation unit and measured value processing.

In 7 the measured data are transferred via cables 8 to a system control 12 where they are converted accordingly. The encoder 1 is supplied with power via cables 9. A connector 10/11 is fitted to the transfer lines 8,9.

The system control 12 is provided with a mains supply 14, which supplies the encoder via the mains cable 15 and the transfer lines 9. This also charges the battery 2.

When mains power fails the auxiliary power supply 13 present can take over the supply to the encoder 1. If this also fails or connector 10/11 is removed the encoder 1 still remains active but only with respect to determining the segments. This energy saving operation can be ensured for a long period of time due to the supply by the auxiliary power supply 2 adjusted accordingly. Switching to this emergency power is activated by a comparator 5*a*.

Figure 2:
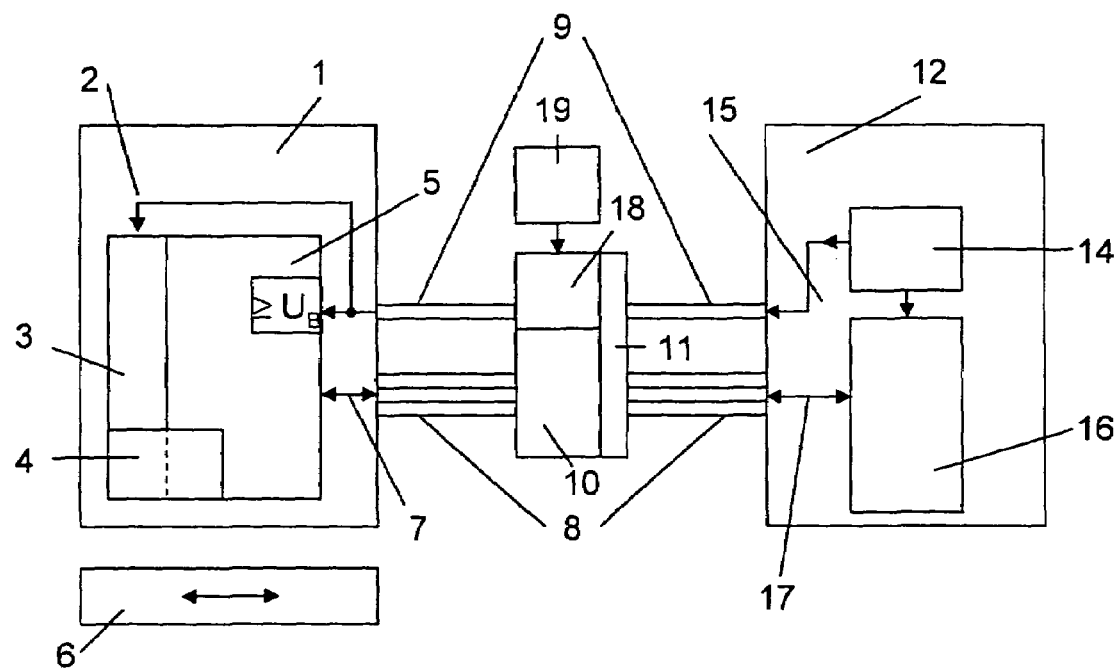

The embodiment shown in FIG. 2 differs from that of FIG. 1 in that the chargeable auxiliary power supply 2 of FIG. 1 is arranged as a chargeable auxiliary power supply 18 outside the encoder 1 and in fact in the connector component 10 close to the encoder. This is charged by a charging device 19 attached to or integrated into the connector. The remaining components are labelled in the same way as in FIG. 1. When mains power fails, the auxiliary power supply is fed via the left half of cable 9 and cable 2' to the encoder 1 to give it limited operation. In this case there is no provision for an external auxiliary power supply as with 14 in FIG. 1. The charging device 19 derives its power from one of the above-mentioned options. Cables 8 for data transfer may also be fiber optic cables at least between connector component 10 and encoder 1.

Figure 3:
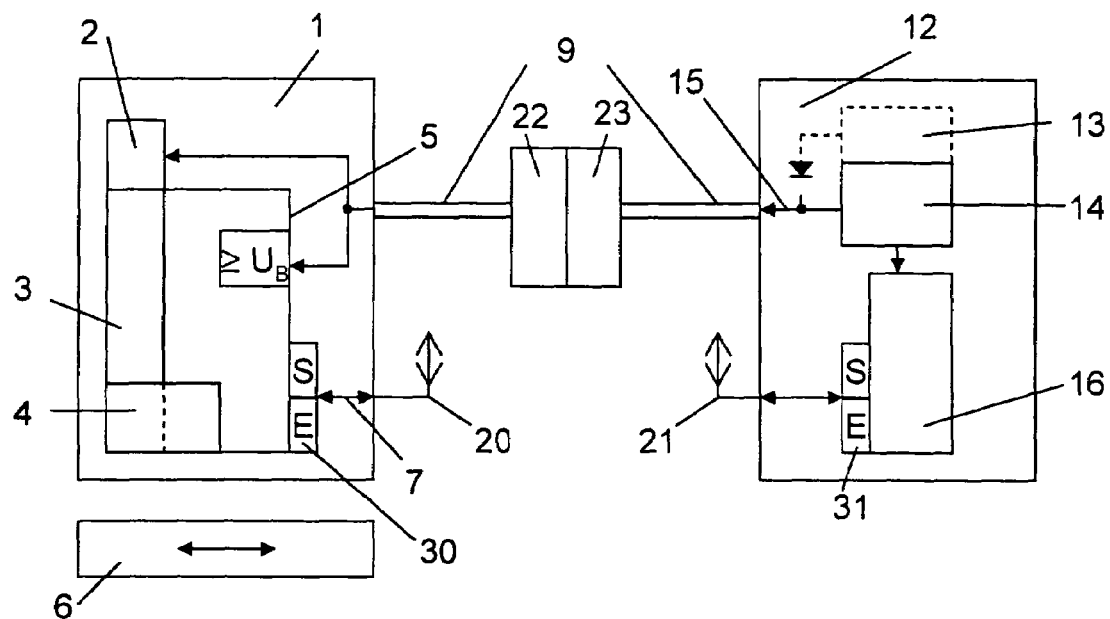

In the embodiment shown in FIG. 3 the auxiliary power supply 2 is again housed in the encoder. The mains supply 14 and if necessary external auxiliary power supply 13 supply the encoder 1 and its chargeable auxiliary power supply 2 via cables 9, to which a connector 22/23 is fitted. In this case data transfer is by radio, which is why the encoder 1 and system control 12 are each equipped with a send and receive antenna 20 or 21 and a transmitter and receiver 30 or 31. In this case cables 9 may also be fiber optic cables, especially on the encoder side.

Figure 4:
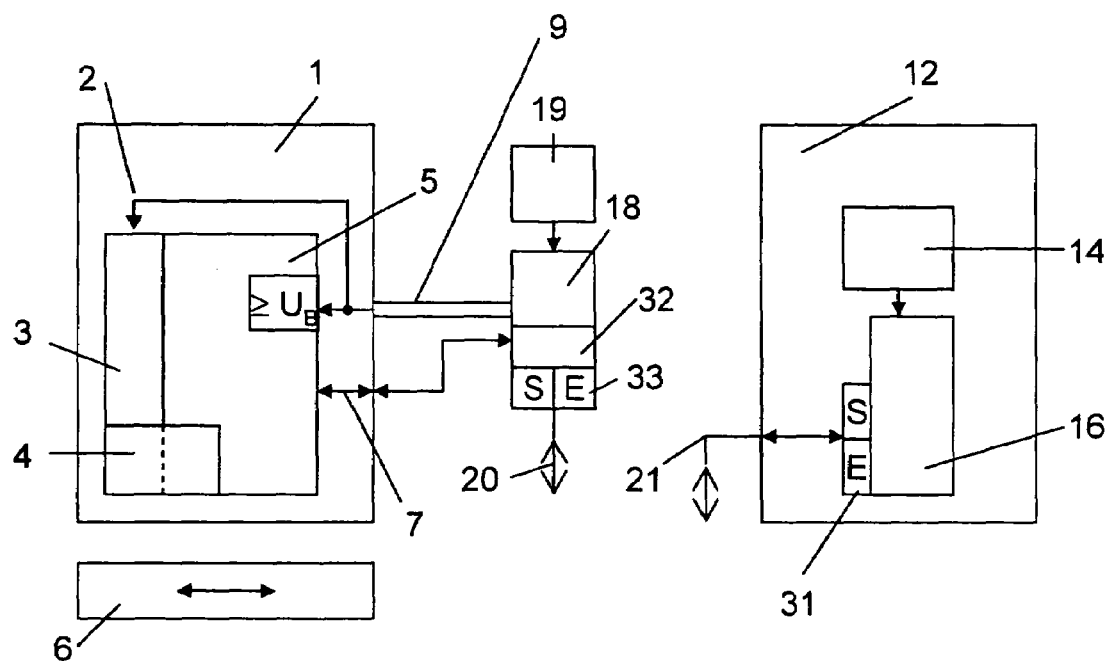

In the embodiment of FIG. 4 there is no longer a cable connection between the encoder 1 and the system control 12. In this case, there is a transmitter and receiver 33 with a send and receive antenna 20 outside but close to the encoder 1. The send and receive data of logic 5 are transferred to the send and receive data converter via another logic 32 and the serial measured data exchange 7 to logic 5 or from this via radio (transmitter/receiver 31,33) to the system control 12 (especially SSI). Once again the chargeable auxiliary power supply 18 is located outside the encoder 1 as in FIG. 2. Similarly it is charged by a charging device 19 which is also supplied by the mains. Reduced radio transmission during battery operation is also feasible here.

I claim:

1. An absolute measuring system for determining angles or paths, comprising:
    a main voltage supply;
    an encoder receiving during normal operation a voltage supply from said main voltage supply, said encoder being switched to an auxiliary mode and receiving an auxiliary voltage and uses less energy when said main voltage supply fails, said encoder only determining a coarse determination of a measured value made during the auxiliary mode of operation; and
    a chargeable memory connected to said encoder for providing the auxiliary voltage.

2. The measuring system according to claim 1, wherein said chargeable memory is a battery.

3. The measuring system according to claim 1, wherein said chargeable memory is a chargeable condenser.

4. The measuring system according to claim 1, wherein said chargeable memory contains a chargeable battery and a chargeable condenser.

5. The measuring system according to claim 1, wherein said chargeable memory contains a chargeable condenser and a non-chargeable battery.

6. The measuring system according to claim 1, wherein said chargeable memory is disposed at least in a vicinity of said encoder.

7. The measuring system according to claim 6, wherein said chargeable memory is disposed in said encoder.

8. The measuring system according to claim 6, further comprising a connector coupled to said encoder, said chargeable memory disposed on an encoder side of said connector.

9. The measuring system according to claim 1, wherein said chargeable memory is charged by solar cells.

10. The measuring system according to claim 1, wherein said chargeable memory is charged by electromagnetic waves.

11. The measuring system according to claim 1, wherein sad chargeable memory is charged by transformer coupling.

12. The measuring system according to claim 1, wherein said chargeable memory is charged by a motion induced field induction.

13. The measuring system according to claim 1, further comprising:
   an external auxiliary power supply; and
   cables connecting said external auxiliary power supply and said main voltage supply to said chargeable memory, said chargeable memory being charged by at least one of said main voltage supply and said external auxiliary power supply.

14. The measuring system according to claim 13, further comprising fiber optic cables for measured data exchange disposed at least on a side close to said encoder.

15. The measuring system according to claim 1, further comprising:
   a system controller; and
   a transmitter/receiver transferring signals between said encoder and said system controller via radio waves.

16. The measuring system according to claim 15, wherein said transmitter/receiver reduces radio transmissions during battery operation when the voltage supply fails.

* * * * *